(12) United States Patent
Jenkin

(10) Patent No.: US 6,243,560 B1
(45) Date of Patent: Jun. 5, 2001

(54) LATENCY REDUCTION IN SATELLITE COMMUNICATION SYSTEMS

(75) Inventor: Keith R. Jenkin, Redondo Beach, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/183,399

(22) Filed: Oct. 30, 1998

(51) Int. Cl.$^7$ .................................................. H04Q 7/06
(52) U.S. Cl. .......................... 455/12.1; 455/20; 455/21; 455/3.2; 455/445
(58) Field of Search ............................ 455/12.1, 13.1, 455/16, 20, 21, 22, 3.1, 3.2, 427, 428, 429, 431, 445, 17, 23; 370/316, 323, 325

(56) References Cited

U.S. PATENT DOCUMENTS

| | | | | |
|---|---|---|---|---|
| 5,280,625 | * | 1/1994 | Howarter et al. ................... | 709/218 |
| 5,625,624 | * | 4/1997 | Rosen et al. ....................... | 370/307 |
| 5,864,546 | * | 1/1999 | Campanella ........................ | 370/316 |
| 5,903,621 | * | 5/1999 | Rebec et al. ....................... | 375/377 |
| 5,951,709 | * | 9/1999 | Tanaka ............................... | 714/755 |
| 5,966,412 | * | 10/1999 | Ramaswamy ...................... | 375/341 |
| 6,006,318 | * | 12/1999 | Hansen et al. ...................... | 712/28 |
| 6,044,084 | * | 3/2000 | Fishman ............................. | 370/445 |

* cited by examiner

*Primary Examiner*—Daniel Hunter
*Assistant Examiner*—Yemane Woldetatios
(74) *Attorney, Agent, or Firm*—Robert W. Keller

(57) ABSTRACT

The present method for reducing latency in satellite communication includes the steps of applying, at a first earth terminal, a discriminator to user data. The discriminator delineates action data and forward data, thereby forming delineated user data. The action data represents data to be processed on board a satellite, while the forward data represents data to be forwarded through the satellite without processing. At the satellite, the delineated user data is partitioned into the action data and the forward data. The satellite then processes the action data to form processed action data and transmits, if necessary, the processed action data from the satellite. During processing of the user data, the satellite may generate result data in response to the action data and may transmit the result data alone or appended to the processed action data. Furthermore, the satellite may store a world model in a memory onboard the satellite. The satellite, in processing the action data, may then apply the world model to the action data.

26 Claims, 4 Drawing Sheets

LATENCY REDUCTION IN SATELLITE COMMUNICATION SYSTEMS

BACKGROUND OF THE INVENTION

The present invention relates to satellite communications. In particular, the present invention relates to reduction of latency in a satellite communications network.

Communication satellites routinely relay staggering amounts of information between multiple earth terminals every day. Uplink signals and downlink signals transmitted through a communication satellite, however, are subject to delays corresponding to the signal time-of-flight through space and the atmosphere between the earth terminals and the satellite. In other words, electromagnetic propagation (the signal) travels at the speed of light (as modified by whatever medium it travels through, including the atmosphere). The time-of-flight introduces a time delay or latency in the signal corresponding to the amount of time it takes the signal to reach its destination. Furthermore, other significant contributors to overall latency typically exist within a system, including, for example, data processing time delay.

Geostationary orbit satellites are often used for communications because of their unique orbital property of staying fixed at a given longitude, zero degrees latitude, and a constant range. That is, a geostationary satellite remains at a fixed (earth-centered) location in the sky (i.e., the satellite has a non-varying azimuth and elevation). However, geostationary satellites must fly in a singular, circular orbit having a zero inclination and an altitude of approximately 22,000 miles. At this relatively great distance, the latency for one "leg" (from the Earth to the satellite, or vice versa) of signal transfer is approximately ⅛ of a second. While this may not appear to be a significant delay, it can become a serious or compromising aspect for real-time applications when (as is typically the case) several legs of travel are needed. One "hop" (i.e., two legs, one up, one down) takes about ¼ second.

Thus two hops, a typical scenario for earth terminals to transmit a signal to another earth terminal (e.g., another individual user or to a central communications facility) and receive a response, can take more than ½ second. If individual earth terminals must pass information through a central communications station, a complete communications loop (round trip query/response) may take more than one second.

In real-time applications (including action video games, for example) a one second latency is unacceptable. Furthermore, many business applications, such as videoconferencing and work sharing (e.g., spreadsheet or whiteboard applications) are very sluggish given these latencies. Given the trend to increasing satellite communications with decreasing cost, such applications, were it not for the latencies involved, would be poised to introduce a new level of worldwide interactivity.

In the past, however, no techniques have been proposed to reduce latencies to acceptable levels. One reason is that satellite designs fall into a few general categories, none of which is particularly suited to reducing latency. A satellilte that demodulates an uplink signal and remodulates data for a downlink is referred to as "regenerative". A satellite that demodulates an uplink signal, decodes the signals, and recodes the signals is typically referred to as a "regenerative decode/recode" system or just, "decode/recode". On the other hand, a satellite which simply forwards the received uplink signals unaltered to a ground station is typically referred to as a "bent pipe" system. These past satellite designs, while useful in many situations, do not provide the satellite with anything more than the ability to relay information. Thus, data that needs to be processed in some fashion must make several hops between specialized processing earth terminals, each hop increasing the latency from original transmission to final reception.

A need exists in the industry for a method for reducing latency in satellite communication systems.

BRIEF SUMMARY OF THE INVENTION

It is an object of the present invention to reduce latency in a satellite communication system.

It is another object of the present invention to allow a satellite to process time critical data.

Another object of the present invention is to allow earth terminals located in diverse locations to interact in real-time.

One or more of the foregoing objects are met in whole or in part by a method for reducing latency in signals transmitted between ground stations through a satellite. The method includes the steps of applying, at a first earth terminal, a discriminator to user data. The discriminator delineates action data and forward data, thereby forming delineated user data. The action data represents data to be processed on board a satellite, while the forward data represents data to be forwarded through the satellite without processing.

Subsequently, the earth terminal transmits the delineated user data to a satellite. At the satellite, the delineated user data is partitioned into the action data and the forward data. The satellite then processes the action data to form processed action data and transmits, if necessary, the processed action data from the satellite.

During processing of the user data, the satellite may generate result data in response to the action data and may transmit the result data alone or appended to the processed action data. Thus the satellite, during processing, may prepare additional data as necessary to supplement the processed data. Furthermore, the satellite may store a world model in a memory onboard the satellite. The satellite, in processing the action data, may then apply the world model to the action data.

As an example, the world model may represent a rule set for a video game. The rule set may include, for example, the boundaries (e.g., a race course) within which a player may move, the maximum velocity and acceleration the player may achieve, and effects of environmental effects (e.g., rain, snow, and the like) on the players. The rule set may also include scoring rules (e.g., 100 points for finishing first), collision rules (e.g., collisions occur when two players positions overlap), and the like.

Other world models are also possible. As another example, the world model may represent a conflict scenario. The conflict scenario may include the starting positions of friendly and enemy tanks and planes, and the rules governing their movement, acceleration, identification, and interaction. Thus, rather than incurring extra hops of signal travel to ground based processing centers and associated latency, the satellite may reduce latency by processing action data at the satellite itself.

DETAILED DESCRIPTION OF THE INVENTION

Figure 1:
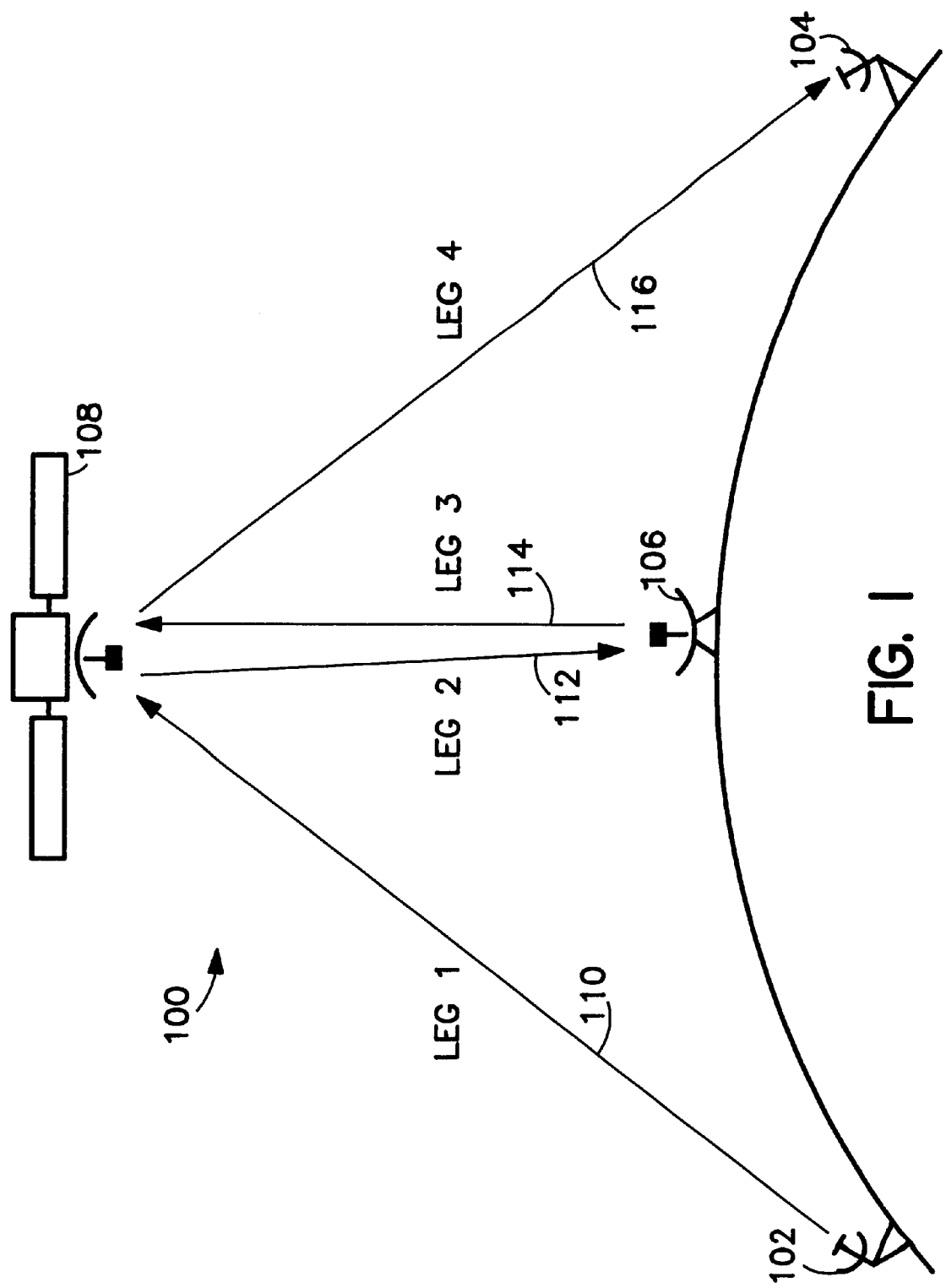
FIG. 1 illustrates a communication system including a ground based processing station.

Turning now to FIG. 1, that figure shows a communication network 100 including a first earth station 102, a second earth station 104, and a processing station 106. Also shown in FIG. 1 is a satellite 108 which relays signals propagating along the first (uplink), second (downlink), third (uplink), and fourth (downlink) legs 110–116.

The processing station 106, for example, manages, controls, and keeps track of the interactivity between the first and second earth stations 102–104. For example, the processing station 106 monitors global game data (matchmaking, scoring, teaming, player position on the field or track, player ranking/handicapping, and the like). The game may be, as an example, an automobile race, where individual wins against a match opponent count toward a team score.

In FIG. 1, the first and second legs 110–112 form a first hop between the first earth station 102 and the processing station 106. Similarly, the first and second legs 114–116 form a second hop between the processing station 106 and the second earth station 104. Each hop, however, introduces approximately a ¼ second latency between reception and transmission of the signal. Thus, in the network 100, a round trip response from the first earth station 102 to the second earth station 104, and back, may take over one second. Even -globally distributed information (including scores, for example) experiences at least ½ second of latency for transmission from one earth station to another through the processing station 106. Given that latencies of more than 300 millisecond are noticeable, the network 100 typically provides unacceptable real-time performance (for example, for action video games).

Figure 2:
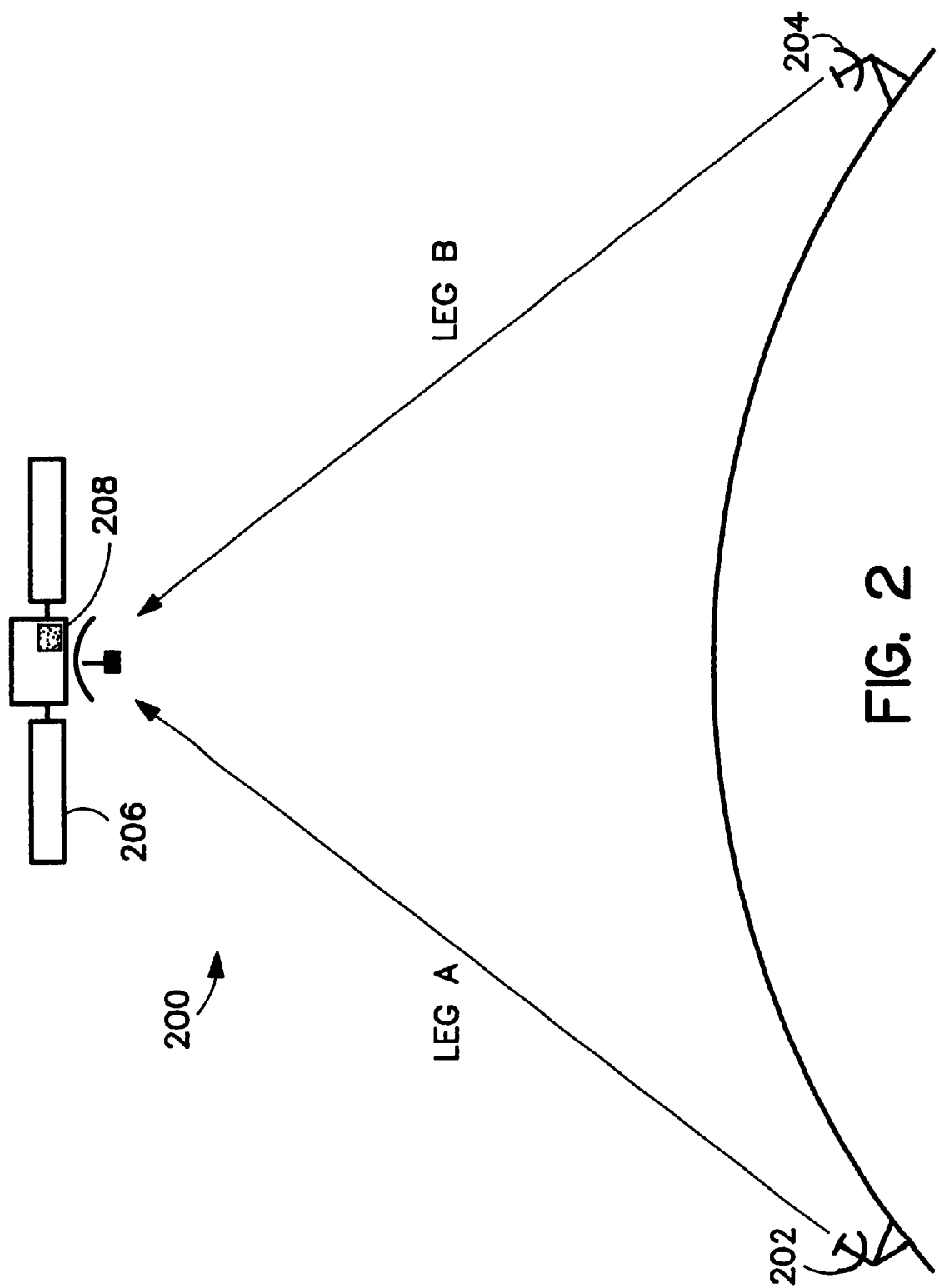
FIG. 2 shows a reduced latency communication system.

The current thinking in modern physics, however, forecloses the possibility of faster-than-light propagation, and therefore allows no improvement in the actual latency between an earth terminal and a satellite. Turning to FIG. 2, however, an improved network 200 is illustrated that dramatically reduces latency using another technique. FIG. 2 includes a first earth station 202, a second earth station 204, and a satellite 206. Unlike the satellite 108 in FIG. 1, however, the satellite 206 includes a communication payload processor 208 (discussed in more detail below) that replaces the processing center 106 for time sensitive data processing (although the processing station 106 may still be used for non-time sensitive tasks).

Generally speaking, in FIG. 2, the earth stations 202–204 transmit uplink signals carrying user data to the satellite 206. The user data may be partitioned between action data and forward data. The action data is data of a time sensitive nature that the satellite 206 will process, while the forward data is data that the satellite 206 will simply relay to its destination. A discriminator is typically used identify action data and forward data. The discriminator, for example, may be an identifying code, a predetermined time slot or symbol position with a frame, or any marker that signifies that a particular piece of user data needs to be processed on the satellite 206.

Upon reception of the uplink signal, the satellite 206 may partition the user data into its action data and forward data constituents. The satellite 206 may then process the action data, produce processed action data, and forward the processed action data, if necessary, to any destination earth station in a downlink. The processing station 106 is thereby removed from the communication path for time critical signals, and latency is greatly reduced.

As a particular example, the satellite 206 may perform the time sensitive operations required in a racing video game. In one implementation, a central control facility (e.g., the processing station 106) may team up players (drivers) based on their prior performance in previous races. The video game at each earth station location may then display the scene (view of the race course) for the local driver, in rendered "3D" (actually perspective 2D), showing the other participating cars as well.

In other words, a driver sees a screen display appearing much as though the driver were looking through the windshield, seeing the road ahead and other cars within view. The real-time data to be exchanged by a given driver's video game to depict the action through the satellite 206 is typically relatively small in quantity (but critical in temporal currency). As an example, the action data for a racing game may include driver position, motion, and attitude vectors (i.e., driver status) at a given instant. Such information may be sent to the satellite very frequently by the driver's video game and perhaps updated many times each second, so that other drivers have nearly instant knowledge of other drivers' position, motion, and attitude.

Other non-time-critical ancillary information (i.e., forward data not requiring satellite processing) such as a driver's ID and ranking, car description, and the like may be sent at the start of the race to the processing station 106. Thus, provided with the position, motion, and attitude information of the other drivers, the local video game can then render an accurate scenario of the local driver's situation including competing drivers, and perform game logic in situ (such as collision assessment).

The estimated resource requirement on the satellite is relatively small, as illustrated below in Table 1.

TABLE 1

| Satellite payload storage per driver. | | | |
|---|---|---|---|
| Status Data | Bits | Bytes | Comment |
| Position X (on the track) | 24 | 3 | within a fraction of an inch |
| Position Y (on the track) | 24 | 3 | within a fraction of an inch |
| Position Z (above the track) | 8 | 1 | cars can become airborne over jumps |
| Velocity X | 16 | 2 | speed component with respect to track axis |
| Velocity Y | 16 | 2 | speed component with respect to track axis |
| Velocity Z | 8 | 1 | altitude rate of change |
| Attitude X | 8 | 1 | (1/256 of a circle) |
| Attitude Y | 8 | 1 | (1/256 of a circle) |
| Attitude Z | 8 | 1 | (1/256 of a circle) |
| Misc | 8 | 1 | flags |
| Total | 128 | 16 | |

The satellite onboard storage for supporting 20,000 drivers would then consume as little as 320,000 bytes (20,000 players*16 bytes/player). The bit rate per player, assuming 100 driver status information updates per second and 4 drivers in a single race is then as little as 12,800 bits per second (100 updates/sec*128 bits/update) on the uplink and 38,400 bits per second (100 updates/sec*128 bits/update*3 players) on the downlink.

In processing the action data, (e.g., the driver status), the satellite 206 may, for example, simply update the status information stored in the satellite 206 with action data received from each drivers video game. The satellite 206, however, may also perform more complicated processing of the action data, including updating each drivers status, based on position, velocity, and acceleration. As another example, the satellite 206 may determine collisions between drivers by examining the X, Y, and Z locations of each driver.

If a collision is detected, the satellite 206 may then insert result data (i.e., any additional data generated by the satellite 206 during its processing) into the downlink to each driver. The result data for a collision may represent, for example, the drivers involved in the collision, and its severity as determined by the velocity of the drivers involved. Any other result data may also be provided by the satellite 206, however, including, as another example, the fact that certain drivers have run off the course, are driving in the wrong direction, or have been disqualified.

Furthermore, the satellite 206 need not perform its processing in isolation. Rather, the satellite 206 may apply a world model to the action data. The world model represents the set of rules or other constraints associated with the type of action data the satellite is processing. Thus, for example, the world model for a racing game may include maximum velocity and acceleration, effects of collisions, location of hazards (e.g., oil spills) on the track, and the like. In applying the world model to the action data, the satllite 206 may then determine additional result data to be distributed to each driver. Thus, for example, a world model may indicate that a collision at greater than 80 miles per hour destroys both cars. The result data stemming from such a collision may then indicate to each driver that the colliding drivers are to be removed from the race.

Another example of an application which may benefit from satellite processing is a conflict (e.g., war game) scenario. In a world model for a conflict scenario, the rule set may include the starting location, velocity, and acceleration of hostile targets, friendly targets, supply depots, airstrips, amount of sustainable damage per target, damage delivering capability per target, and the like. In applying the world model to the action data (which may include status information for planes, tanks, ground troops and the like), the satellite may determine, for example, the location of each participant and the friendly or hostile units that the participant can interact with.

Business applications are also suitable for processing by the satellite. As an example, the satellite may process movements (i.e., action data) of virtual markers and erasers over a whiteboard. The satellite, in response, may then keep track of the current whiteboard status, including new marks and erasures. The processed status of the whiteboard may then be transmitted to each participant or observer of the whiteboarding session.

Figure 3:
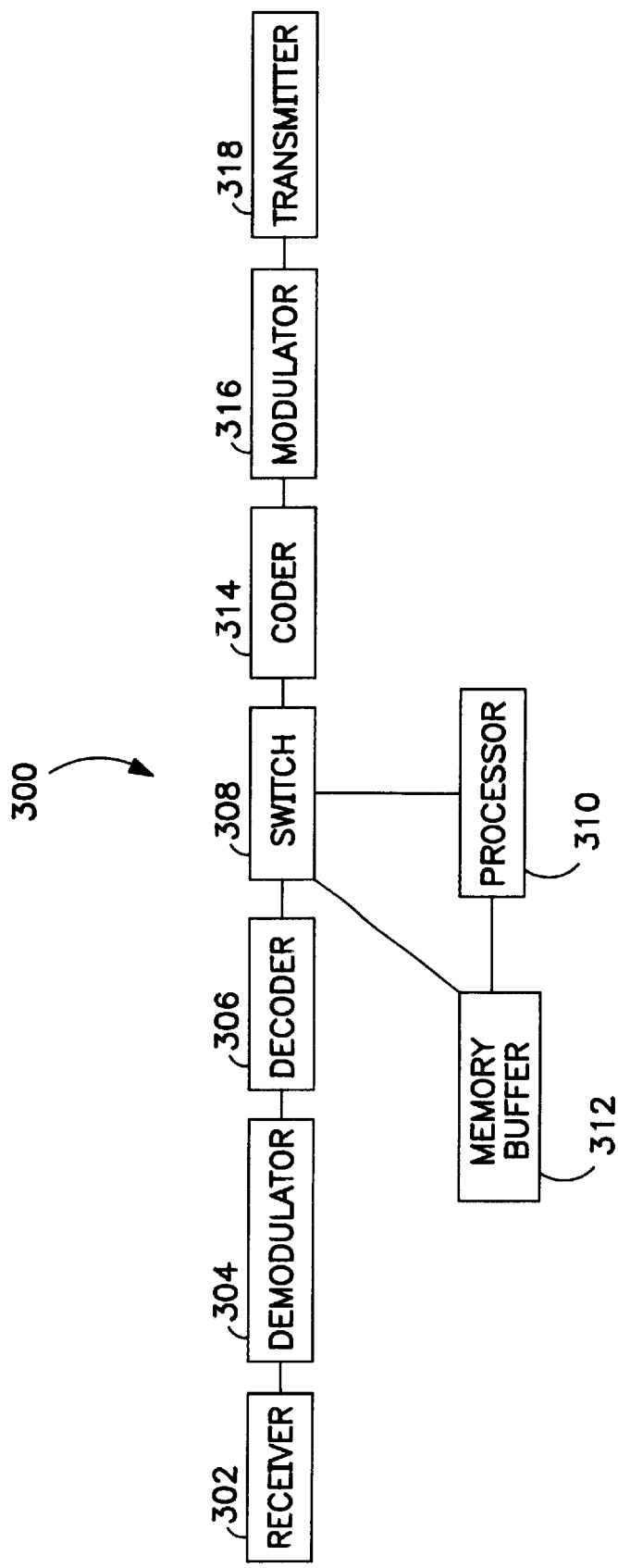
FIG. 3 depicts one embodiment of a processing satellite that may be used to reduce latency in signal transmission.

Turning now to FIG. 3, that figure shows one embodiment of a satellite 300 that may be used in the present invention. The satellite 300 includes a receiver 302, a demodulator 304, a decoder 306, and a switch 308. The satellite 300 also includes a processor 310, a memory 312, a coder 314, a modulator 316, and a transmitter 318.

The receiver 302 generally includes the satellite uplink antenna and amplifiers. The demodulator 304 may, for example, demodulate QPSK, BPSK, GMSK, or other modulation applied to an uplink signal. The decoder 306, for example, may be a Reed Solomon and convolutional decoder pair to decode concatenated coded user data. The switch 308 includes circuitry (e.g., discrete logic, or microprocesor control) that partitions the user data recovered by the decoder 306 into action data and forward data. The forward data may then be passed directly to the coder 314 (e.g., a Reed Solomon and convolutional coder pair), the modualtor 316 (to apply QPSK, GMSK, BPSK, or other modulation), and the transmitter 318 for transmission to an earth station. Alternatively, the forward data may be buffered in the memory 312 until enough forward data is accumulated to fill downlink time slots efficiently.

Action data recovered by the switch 308, however, is processed by the processor 310. To this end, the switch 308 typically stores the action data in the memory 312. After processing, the processor 310 passes the processed action data (e.g., representing the updated status of drivers in a racing game), and any result data back through the switch 308 for transmission (as outlined above).

Figure 4:
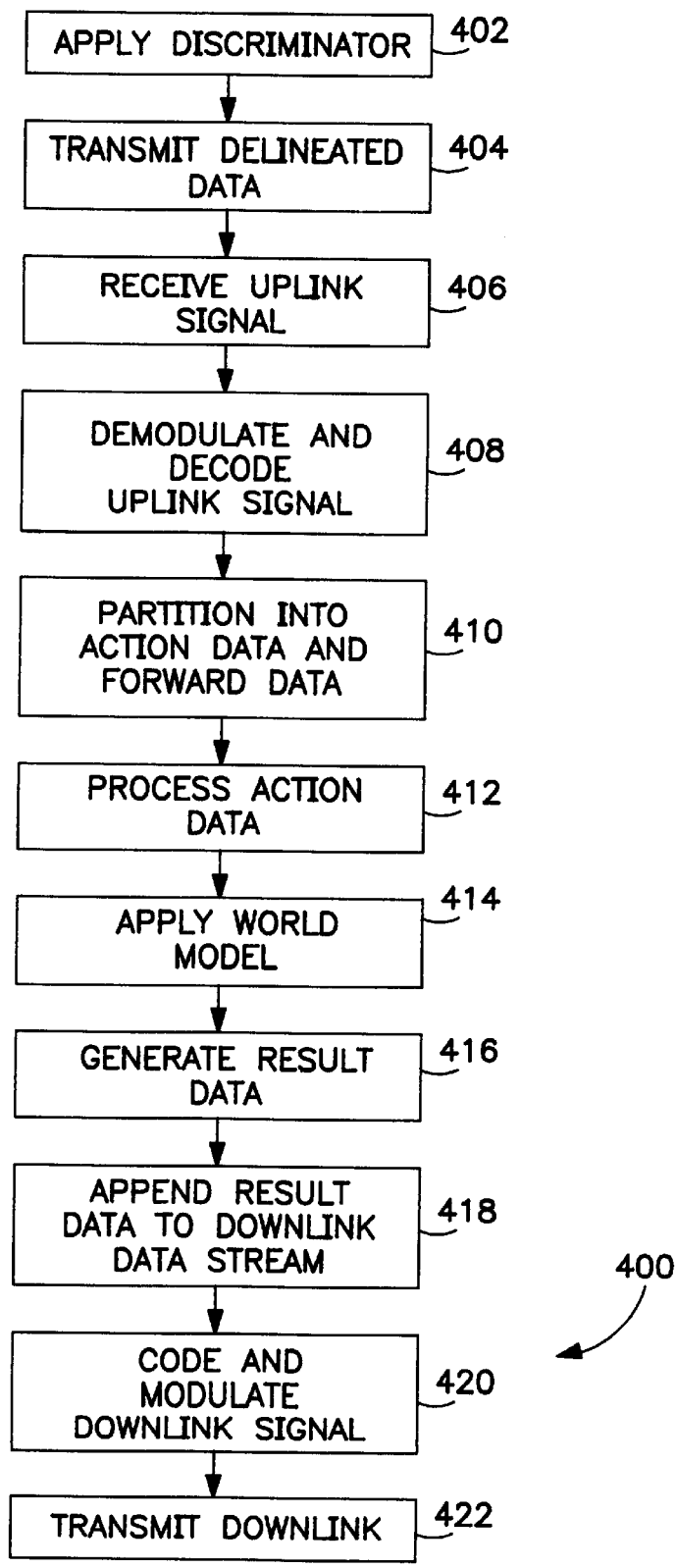
FIG. 4 illustrates a flow diagram of reduced latency transmission.

Turning now to FIG. 4, that figure shows a flow diagram 400 of the latency reduction method of the present invention. At step 402, the earth station applies a discriminator to the user data to be transmitted to the satellite. The discriminator generally delineates the user data between action data and forward data, for example, by setting a flag in a header, applying a particular code, or formatting the action data and forward data for transmission in predetermined time slots assigned to action data and forward data. The delineated data is subsequently transmitted in step 404.

The satellite, at step 406, receives the uplink signal carrying the delineated user data. The uplink signal is demodulated and decoded at step 408, and the resultant recovered user data is partitioned at step 410 into action data and forward data based on the discriminator applied in step 402. In other words, the partitioning step 410 identifies and separates action data from the user data. Once the action data has been separated from the user data, the action data is processed at step 412.

The processing may, for example, update previously stored values with new values provided in the action data. As noted above, during processing the processor may apply a world model (step 414) to the action data, and generate result data (step 416). At step 418, the result data is appended to processed action data for transmission. If the processed action data does not need to be transmitted at the current instant (e.g., it just needs to be stored onboard the satellite), then the result data may be transmitted alone. Before transmission, a downlink signal is coded (e.g., using block codes, convolutional codes, or both) and modulated in step 420. Transmission subsequently occurs at step 422.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed is:

1. A method for reducing latency in a satellite communication system that relays information between first and second earth stations through a satellite, the method comprising:

receiving user data at a satellite;

partitioning the user data into action data and forward data in accordance with a discriminator that delineates the user data from the forward data;

applying selected processing to the action data on the satellite to form processed action data, without applying the selected processing to the forward data; and transmitting the forward data and the processed action data to at least one earth station.

2. The method of claim 1, wherein said step of applying further comprises:

generating result data in response to said action data; and appending said result data to a downlink data stream.

3. The method of claim 2, further comprising:

storing a world model in a memory on said satellite; and wherein said step of applying further comprises applying said world model to said action data.

4. The method of claim 3, wherein said step of storing a world model comprises storing a world model representing a video game rule set.

5. The method of claim 4, wherein said step of storing a world model comprises storing a world model representing a conflict scenario rule set.

6. The method of claim 1, further comprising:

storing a world model in a memory on said satellite; and wherein said step of applying further comprises applying said world model to said action data.

7. The method of claim 6, wherein said step of storing a world model comprises storing a world model representing a video game rule set.

8. The method of claim 6, wherein said step of storing a world model comprises storing a world model representing a conflict scenario rule set.

9. The method of claim 1, further comprising:

updating status information stored in the satellite in accordance with at least a portion of the action data.

10. A method for reducing latency in signals transmitted between first and second earth stations through a satellite, the method comprising:

applying at a first earth station a discriminator to user data delineating action data and forward data, thereby forming delineated user data;

transmitting said delineated user data to a satellite;

partitioning at said satellite said delineated user data into said action data and said forward data;

processing said action data to form processed action data; and transmitting said processed action data from said satellite.

11. The method of claim 10, wherein said step of processing further comprises:

generating result data in response to said action data; and appending said result data to a downlink data stream.

12. The method of claim 11, further comprising:

storing a world model in a memory on said satellite; and wherein said step of processing further comprises applying said world model to said action data.

13. The method of claim 12, wherein said step of storing a world model comprises storing a world model representing a video game rule set.

14. The method of claim 13, wherein said step of storing a world model comprises storing a world model representing a conflict scenario rule set.

15. The method of claim 10, further comprising:

storing a world model in a memory on said satellite; and wherein said step of processing further comprises applying said world model to said action data.

16. The method of claim 15, wherein said step of storing a world model comprises storing a world model representing a video game rule set.

17. The method of claim 15, wherein said step of storing a world model comprises storing a world model representing a conflict scenario rule set.

18. The method of claim 10, further comprising: coding said forward data to form coded forward data;

modulating said coded forward data to form modulated forward data; and transmitting said modulated forward data.

19. The method of claim 1, wherein partitioning comprises partitioning the user data in accordance with at least one of a symbol position, code, and time slot discriminator.

20. A processing satellite for a reduced latency satellite communication system, the processing satellite comprising:

a receiver for receiving user data;

processing circuitry adapted to partition the user data into action data and forward data in accordance with a discriminator that delineates the user data from the forward data, the processing circuitry further adapted to apply selected processing to the action data to form processed action data, without applying the selected processing to the forward data; and a transmitter for transmitting the forward data and the processed action data to at least one earth station.

21. The processing satellite of claim 20, further comprising a memory buffer for storing the action data for processing.

22. The processing satellite of claim 21, wherein the processing circuitry includes a switch coupled to the memory buffer and the receiver for switching the action data into the memory buffer.

23. The processing satellite of claim 22, wherein the switch is coupled to the transmitter for switching the forward data to the transmitter.

24. The processing satellite of claim 22, wherein the processing circuitry further includes a processor coupled to the memory buffer for applying the selected processing to the action data.

25. The processing satellite of claim 20, wherein the selected processing includes a world model comprising rules for an application selected from video game applications, conflict scenario applications, and business applications.

26. The processing satellite of claim 25, wherein the memory buffer stores status information for the application, and wherein the processing circuitry is adapted to update the status information in accordance with at least a portion of the action data.

* * * * *